Nov. 29, 1960 R. D. THOMPSON 2,962,546

COLOR TELEVISION INDEXING APPARATUS

Filed Aug. 26, 1958 3 Sheets-Sheet 1

INVENTOR.
ROGER D. THOMPSON
BY Carl V. Olson
ATTORNEY

Nov. 29, 1960 R. D. THOMPSON 2,962,546

COLOR TELEVISION INDEXING APPARATUS

Filed Aug. 26, 1958 3 Sheets-Sheet 2

INVENTOR.
ROGER D. THOMPSON

BY Carl V. Olson

ATTORNEY

Nov. 29, 1960 R. D. THOMPSON 2,962,546

COLOR TELEVISION INDEXING APPARATUS

Filed Aug. 26, 1958

3 Sheets-Sheet 3

INVENTOR.
ROGER D. THOMPSON
BY Carl V. Olson
ATTORNEY 2,962,546

COLOR TELEVISION INDEXING APPARATUS

Roger D. Thompson, Princeton, N.J., assignor to Radio Corporation of America, a corporation of Delaware Filed Aug. 26, 1958, Ser. No. 757,425

4 Claims. (Cl. 178—5.4)

This invention relates to color image reproducing means. The invention is particularly useful in single-beam vertical-line-screen color television receiver systems of the sensing type for the purpose of preventing pulling of the indexing signal by the video signal.

A color television signal, according to the broadcasting standards in the United States, includes a color subcarrier having a frequency of 3.58 megacycles which carries color hue information in the form of phase modulation, and color saturation information in the form of amplitude modulation. Therefore, the color subcarrier contains information regarding the red, blue and green colors, in succession, repeating at the 3.58 megacycle rate. In the kinescope of a vertical line screen color television receiver, red, blue and green light emitting phosphor strips are arranged in vertical lines, in repeating triads or groups, to form an image screen. An electron beam is deflected to scan horizontally across the strips. Each successive horizontal scan line is displaced downwardly until the entire image screen is scanned. The scanning process is then repeated. Since the color subcarrier contains information regarding the colors in succession, and since the phosphor line screen is constructed so that color phosphors are scanned in succession, it is possible to produce a color image directly by modulating the electron beam with a color subcarrier. However, since perfectly linear and stable scanning deflection of the electron beam cannot be achieved in practice, some form of synchronizing means is required to insure that the color phosphor impinged by the beam always corresponds with the electrical color signal applied to the beam. This synchronizing means may be constituted by indexing strips registered with the color phosphor strips. The indexing strips may be constructed of ultra-violet light emitting phosphor, wires, secondary emission material, etc. The indexing signal derived from the indexing strips provides information regarding the actual instantaneous position of the electron beam on the image screen with relation to the color of light being produced. The indexing signal is then employed in a servo system to insure the application of the proper electrical color signal to the electron beam at all times.

It is known to employ an image screen wherein one index strip is provided for every group or triad of three color phosphor strips. In such an arrangement, employing a single electron beam, the video or color signal modulation applied to the beam causes a distortion of the indexing signal which varies in accordance with picture content, so that the indexing signal does not accurately represent the point of impingement of the beam on the screen. This distortion of the indexing signal by the video signal is called video pulling. The various means previously proposed to avoid video pulling of the indexing system have not been entirely satisfactory.

It is therefore a general object of this invention to provide an improved line-screen sensing-type color television reproducing system wherein video pulling is avoided.

It is another object to provide an improved sensing type color image reproducing device.

In accordance with the teachings of this invention, a color image reproducing device is provided having an image screen, and scanning means to scan the screen in line-by-line fashion. The image screen is provided with a plurality of different colored light emitting strips arranged transverse to the direction of line scanning in repeating color groups which are energized at a given color group frequency by the scanning means. The image screen also includes indexing means disposed to be energized by the scanning means and to thereby produce an indexing signal. The indexing means is constructed to have a periodic distribution in the line scanning direction so that the indexing signal has a frequency different from the color group frequency and different from the harmonics of the color group frequency. The indexing means is also constructed so that the indexing frequency and low order harmonics thereof cannot cross modulate with the color group frequency and low order harmonics thereof to produce sum or difference frequencies in the region of the indexing frequency. By this construction, the indexing signal is made free of video signal components, and video pulling of the indexing signal is avoided. The indexing means may be ultra-violet light producing phosphor, and is preferably laid on the image screen with a substantially sine wave distribution in thickness or in phosphor efficiency so that the indexing signal is a sine wave free of the harmonics resulting from the use of the prior art narrow strip construction. The indexing material is preferably constructed so that one cycle of the sine wave is coextensive with three cycles of the color phosphor groups or triads. According to another form of the invention which is less expensive to construct, the indexing means is constructed to have a square wave thickness distribution in the line scanning direction with one cycle of the square wave coextensive with three cycles of color groups. Other specific frequency relationships and distributions may be used to minimize video pulling.

These and other objects and aspects of the invention will be apparent to those skilled in the art from the following more detailed description taken in conjunction with the appended drawings, wherein.

Figure 1:
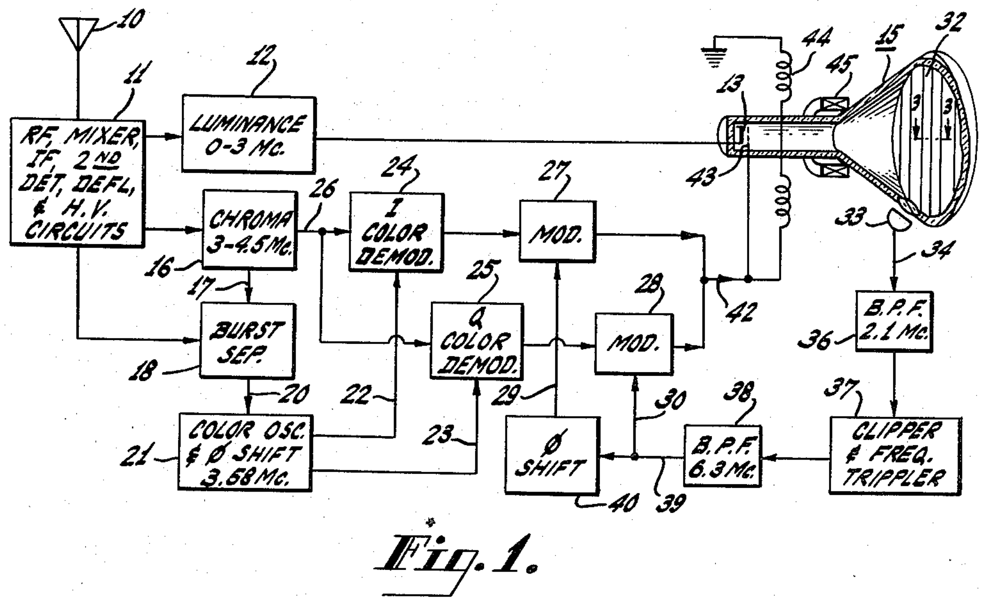
Figure 1 is a block diagram of a line screen color television receiver system incorporating the teachings of the present invention.

Figure 1 shows a block diagram of a vertical line screen sensing color television receiver system. A color television signal according to broadcasting standards in the United States is received by antenna 10 and applied to a box 11 including a radio frequency amplifier, a mixer, an intermediate frequency amplifier, a second detector, and deflection and high voltage circuits. The output of the second detector is divided into two paths, one being applied through a luminance channel 12, having a frequency passband of about 0 to 3 megacycles, to the cathode 13 of a vertical line screen sensing color kinescope 15.

The output of the second detector in box 11 is also applied to a chroma or chrominance channel 16 which passes color subcarrier frequency components in the range of approximately 3 to 4.5 megacycles. An output 17 of the chrominance channel 16 is applied to a burst separator 18. The burst separator 18 is also receptive to a gating pulse from the deflection circuits in box 11, whereby separated color synchronizing burst having a frequency of 3.58 megacycles are applied over lead 20 to a color reference oscillator and phase shift circuit 21. The circuit 21 provides continuous bursts-synchronized color reference oscillations of different phases on output leads 22 and 23 to an I color demodulator 24 and a Q color demodulator 25, respectively. The output 26 of the chrominance channel 16 is applied to both color demodulators 24 and 25. The demodulated I and Q color signals, or more properly, color difference signals, are applied, respectively, to modulators 27 and 28. The modulators 27 and 28 are also supplied over leads 29 and 30 with two phases of a carrier wave which may have a frequency of 6.3 megacycles.

The 6.3 megacycle carrier wave applied to modulators 27 and 28 is derived from the indexing means on the image screen 32 of the kinescope 15. The image screen 32 will be described in greater detail in connection with Figures 3 through 5. For the present it is sufficient to say that the image screen 32 includes indexing means, which may be of ultra-violet light emitting phosphor material, arranged so that the ultra-violet light picked up by phototube 33 provides a signal on lead 34 which is indicative of the color phosphor which the electron beam is striking on the image screen 32. The distribution of the ultra-violet light emitting phosphor on the image screen 32, with relation to the vertical strips of color light emitting phosphor groups or triads thereon, is such that the indexing signal obtained on lead 34 has a frequency equal to 1/3 the frequency at which the color phosphor triads are scanned, in the present example.

The design choice of the frequency at which the color phosphor triads are scanned is arrived at by considerations of definition and color strip width limitations imposed by practical beam size. In a practical arrangement, the number of color phosphor triads in the image screen 32 may be such that the color groups or triads are scanned at a frequency of 6.3 megacycles. Then, since the ultra-violet phosphor indexing means is constructed to have a distribution in the direction of line scanning to provide an indexing signal on lead 34 which is 1/3 as great as the color triad frequency, the indexing signal of lead 34 will have a frequency of 2.1 megacycles.

The 2.1 megacycle indexing signal applied from phototube 33 to bandpass filter 36 actually varies in frequency about the 2.1 megacycle value because of non-linearities in the deflection of the electron beam in kinescope 15. It is this non-linearity in deflection linearity which necessitates the use of an indexing servo system. Therefore, the bandpass filter 36 should pass a band of frequencies which may, for example, have a width of about 10% of 2.1 megacycles. The output bandpass filter 36 is applied to a clipper and frequency trippler 37 from which an output at 6.3 megacycles is selected by means of bandpass filter 38. It is thus apparent that the output of the filter 38 on lead 39 is an indexing signal having a frequency of 6.3 megacycles, which is the same as the frequency at which the color phosphor triads in the image screen 32 are scanned by the electron beam.

The indexing signal on lead 39 is applied over lead 30 to the modulator 28, and is applied through a phase shift circuit 40 and lead 29 to the modulator 27. The outputs of the I and Q demodulators 24 and 25 are applied respectively to the modulators 27 and 28, with the result that the common output 42 of the modulators 27 and 28 is a 6.3 megacycle carrier wave which is phase modulated with color hue information, and amplitude modulated with color saturation information. The color signal on lead 42 is applied to one or the other or both of the kinescope grid 43 and the spot arresting deflection coil 44. This color signal applied to the kinescope 15 differs from the chrominance signal in chrominance amplifier 16 in that it has a carrier frequency of 6.3 megacycles, rather than 3.58 megacycles, and in that the 6.3 megacycle carrier wave varies in frequency in accordance with the scanning non-linearities so that the color signal applied to the kinescope always corresponds to the color of the phosphor strip on image screen 32 which is impinged by the electron beam.

It will be understood that Figure 1 is an illustrative diagram, and that various known modifications thereto can be made. For example, it may be preferable to employ an adder circuit for combining the luminance signal from the luminance channel 12 and the color signal on lead 42, and to apply the combined signal to the grid 43, the spot arresting coil 44 being left connected to the lead 42. In this event, the cathode 13 would be returned to a reference potential. Connections, not shown, are of course made from the deflection and high voltage circuits in box 11 to the deflection yoke 45 and the high voltage terminal of the kinescope 15.

Figure 2:
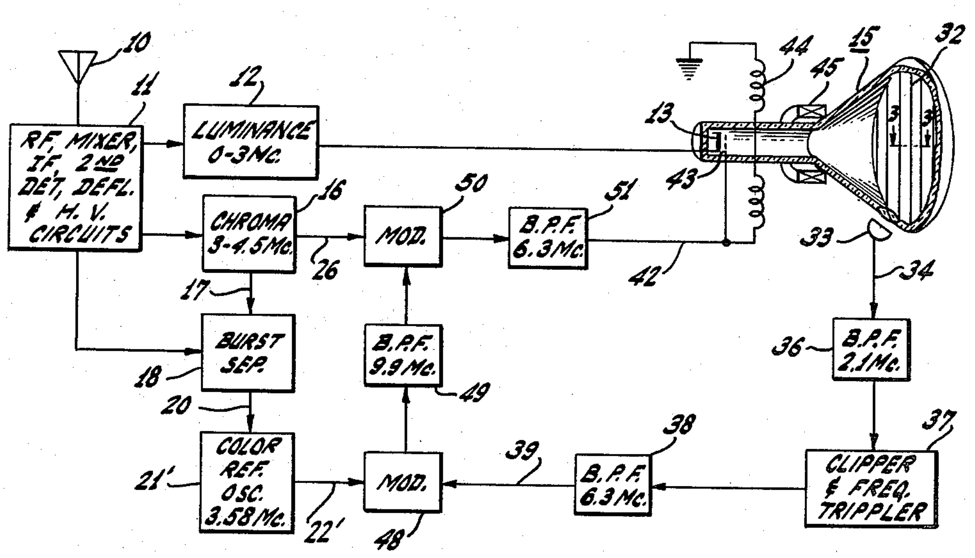
Figure 2 is a block diagram of another color television receiving system incorporating the present invention.

Figure 1 described above shows the present invention as incorporated in a line screen color television receiver of the type wherein the chrominance signal is demodulated to provide color difference signals which are in turn modulated on an indexing signal for application to the kienscope. Figure 2 illustrates the invention incorporated in another line screen color television system wherein the chrominance signal is not demodulated, but rather a double heterodyne system is employed to translate the chrominance signal from a modulated 3.58 megacycle carrier to a modulated 6.3 megacycle carrier derived from the indexing system. Corresponding circuit elements in Figure 2 are given the same reference numerals appearing in Figure 1. The 3.58 megacycle color reference oscillation from oscillator 21′ is applied over lead 22′ to a modulator 48 which also receives the 6.3 megacycle indexing signal on lead 39. The sum frequencies produced by modulator 48 are selected by a bandpass filter 49 having a frequency passband of about 10% around the sum frequency of 9.9 megacycles. The 9.9 megacycle signal from bandpass filter 49 is applied to modulator 50 which also receives the modulated 3.58 megacycle chrominance signal on lead 26. The difference frequency components generated by modulator 50 are selected by a bandpass filter 51 having a center frequency of 6.3 megacycles. The color modulated 6.3 megacycle signal from filter 51 is applied over lead 42 to the control grid 43 and spot arresting coil 44 of the kinescope 15. It is thus seen that the color signal on lead 42 in Figure 2 is the same as the color signal on lead 42 in Figure 1, although the signals are derived by different methods.

Figure 6:
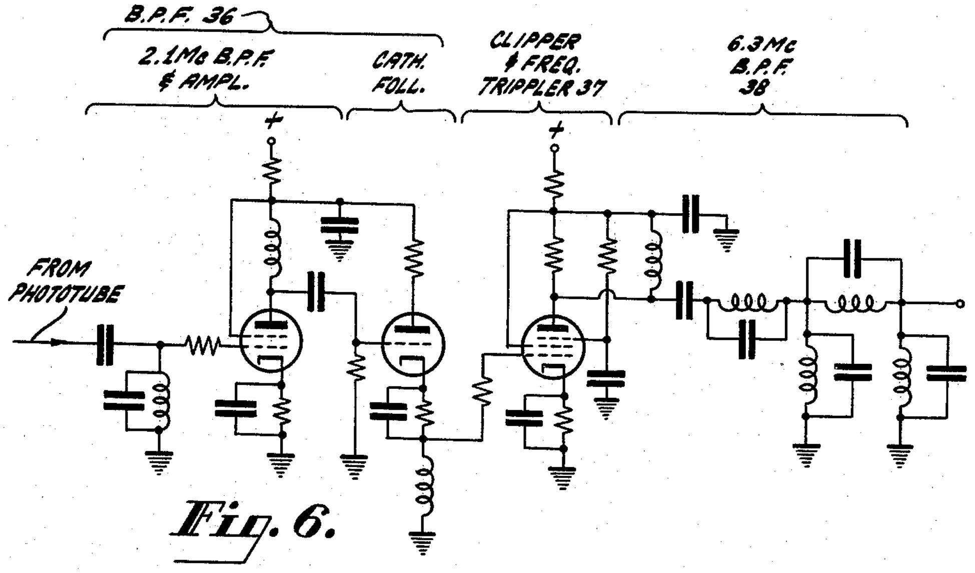
Figure 6 is a circuit diagram which may be substituted into three of the blocks in each of Figures 1 and 2.

The bandpass filter 36, the clipper and frequency trippler 37, and the bandpass filter 38 shown in Figures 1 and 2 may be of any conventional design. For the sake of completeness, a circuit which has been found suitable for the purpose is shown in Figure6 of the drawings.

Figure 7:
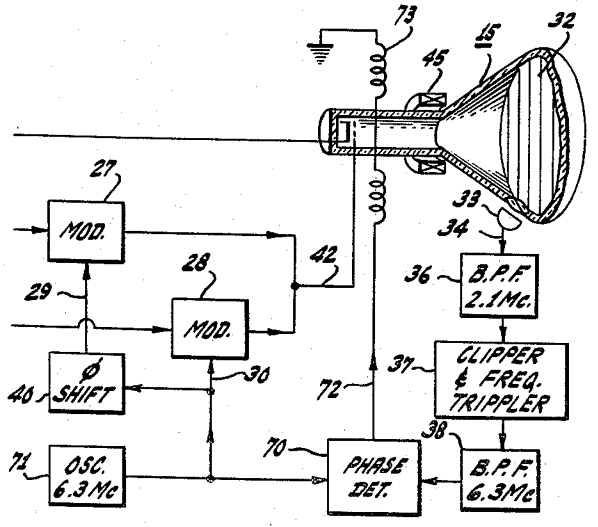
Figure 7 illustrates a modification of the system of Figure 1 which differs in that the 6.3 megacycle color signal is maintained constant in frequency and the indexing signal is employed to correct the deflection of the beam.

Both of Figures 1 and 2 show systems wherein the indexing signal is employed to vary the frequency of the color-modulated signal on lead 42 to compensate for deflection non-linearities. The invention is also applicable to systems wherein the color-modulated signal on lead 42 is maintained at a constant frequency, and the indexing signal is employed to correct the deflection nonlinearities. Figure 7 shows a modification of the system of Figure 1 for operation in the latter manner. The indexing signal output of the bandpass filter 38 is applied to a phase detector of 70. The output of a stable 6.3 megacycle oscillator 71 is coupled to the phase detector 70 and is also coupled to modulator 28 and through phase shifter 40 to modulator 27. The output of phase detector 70 is applied over lead 72 to an auxiliary deflection coil 73 to linearize the deflection of the beam. The system of Figure 2 may be similarly modified.

Figures 3, 4, 5:
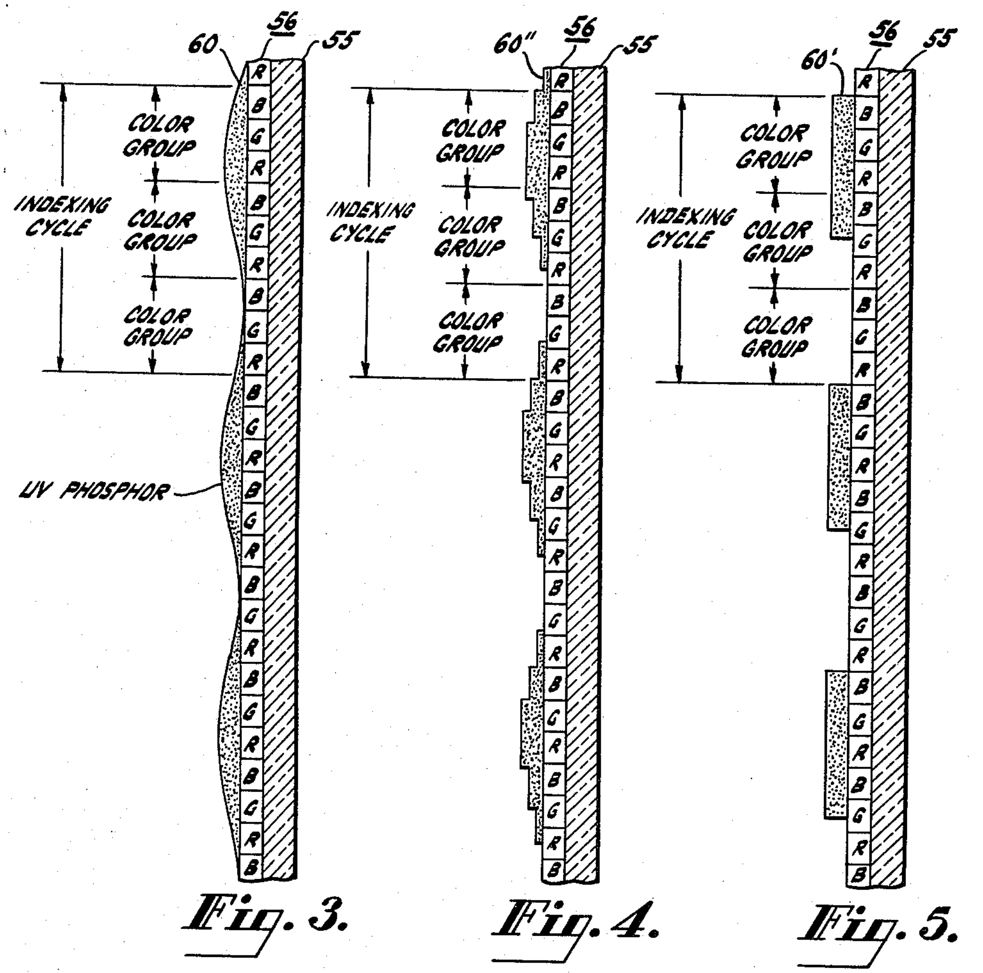
Figure 3 is a fragmentary sectional view taken on a horizontal line through the image screen of a color vertical line screen sensing kinescope constructed in accordance with this invention and including indexing means in a sinusoidal distribution.
Figure 4 is a sectional view like Figure 3 illustrating indexing means having a distribution approximating the sine wave distribution shown in Figure 3.
Figure 5 is a sectional view similar to Figures 3 and 4 but illustrating indexing means constructed according to a square wave distribution.

Reference will now be made to Figure 3 of the drawings for a description of the construction of the image screen 32 in the systems of Figures 1 and 2. The image screen 32 consists of a glass faceplate 55 through which the color image is viewed. Vertically arrange color light emitting phosphor strips 56 are deposited on the inner surface of the faceplate 55. The phosphor strips are identified as R, B and G to indicate the color of light emitted therefrom when impinged by the cathode ray or electron beam. It will be noted that the color phosphor strips are in repeating groups or triads having a dimension in the direction of horizontal scan as indicated on the drawing.

An indexing means or material 60 is deposited on the color phosphor strips. The indexing material 60 may, for example, be an ultra-violet light emitting phosphor. The indexing material 60 is preferably constructed to have a distribution in the line scanning direction such that one indexing cycle is coextensive with three color phosphor groups or triads. The distribution of the indexing material 60 is preferably such as to provide for the emission of ultra-violet light which varies in amplitude in accordance with a sine wave. This effect may be achieved by varying the thickness of the ultra-violet phosphor 60 in accordance with a sine wave.

It will be understood that a thin aluminum layer may be employed between color phosphor strips and the ultra-violet indexing phosphor 60 to reflect the ultra-violet light rearwardly to an ultra-violet phototube. Other known variations and refinements in image screen construction may of course be employed.

When an electron beam scans the image screen, shown in horizontal section in Figure 3, the beam approaches from the left and sweeps, say, from the top to the bottom of the sectional figure. It will be seen that the beam energizes the color phosphor groups at a color group frequency determined by the dimensions of the color groups and the scanning rate. It will also be seen that the electron beam simultaneously energizes ultra-violet phosphor 60 to produce ultra-violet light which varies in amplitude at an indexing frequency equal to 1/3 the color group frequency. The variation in emission of ultra-violet light is picked up by a photocell to produce an electrical indexing signal having an indexing frequency equal to 1/3 of the color group frequency. The precise 1/3 relationship in frequencies is maintained although both frequencies vary somewhat due to scanning nonlinearities. The 1/3 frequency indexing signal is tripled by the circuits 37 and 38 shown in Figures 1 and 2 to provide an indexing signal which is exactly equal to the color group scanning frequency. The 1/3 relationship between indexing means 60 and the color phosphor groups in the image screen 32 is employed for the purpose of preventing video pulling of the indexing signal.

Figure 8:
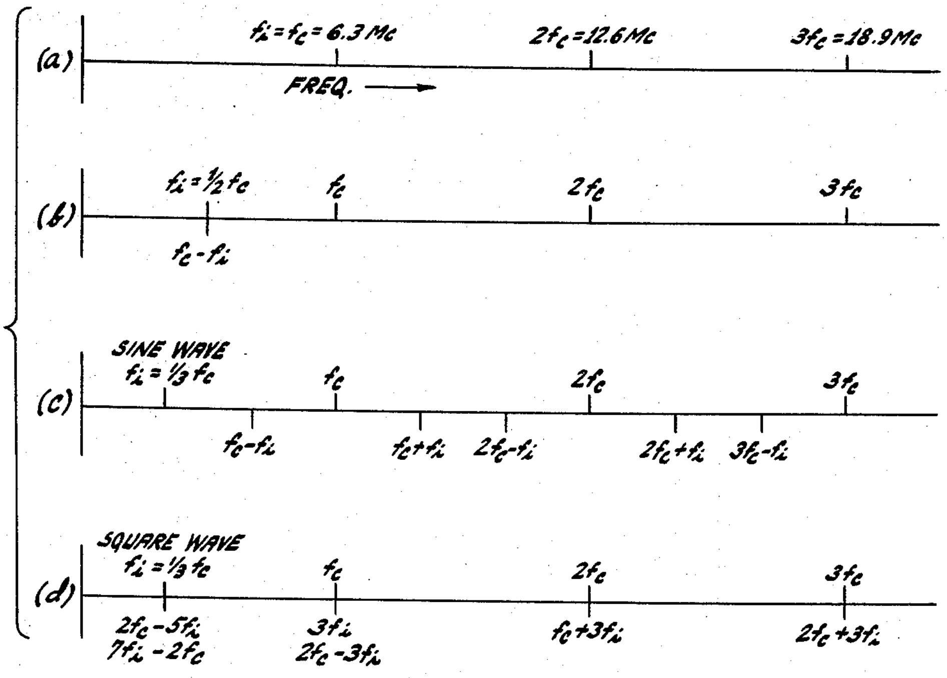
Figure 8 is a frequency chart which will be referred to in explaining the invention.

Reference will now be made to Figure 8 for a discussion of the effect of the relationship between indexing and color group frequencies on video pulling. Figure 8*a* is a frequency chart wherein color group frequencies $f_c$ and harmonics are marked at 6.8 megacycles, 12.6 megacycles and 18.9 megacycles. If, as has been the practice, the indexing frequency $f_i$ is the same as the color group frequency, video picture information on the electron beam is superimposed on the indexing signal and cannot be readily separated therefrom. This condition obtains when one UV phosphor strip, or other indexing strip, is employed for each color phosphor group or triad. The resulting distortion of the indexing signal in accordance with the picture information greatly degrades the fidelity of color reproduction in the image.

Figure 8*b* is a frequency chart illustrating the use of an indexing frequency equal to 1/2 the color group frequency. This arrangement also suffers from the video pulling defect because the difference frequency $f_c-f_i$ between the color group frequency and the indexing frequency falls in the vicinity of the indexing frequency $f_i$.

Figure 8*c* illustrates how applicant's invention avoids video pulling by employing an indexing signal $f_i$ which is equal to 1/3 the color group frequency $f_c$, and wherein the indexing means is given a sine wave distribution in the scanning direction. It will be noted that the modulation products indicated below the reference line are all at frequencies remote from the indexing frequency $f_i$. Therefore, the indexing frequency selected by the bandpass filter 36 in Figures 1 and 2 is free of the video modulation on the electron beam.

Figure 8*d* is a frequency chart illustrating the extent of video pulling in a modified form of applicant's invention shown in Figure 5 wherein the indexing means is given a square wave distribution at an indexing frequency of 1/3 the color group frequency. A square wave distribution is one wherein the width of the strips is equal to the space between strips. The arrangement of Figures 5 and 8*d* results in all of the modulation products shown below the line in the sine wave arrangement of Figure 8*c*, and in addition, results in the modulation products shown below the line in Figure 8*d*. It will be noted that the use of a square wave indexing means results in an interfering signal of frequency equal to the indexing frequency and comprising $2f_c-5f_i$, the difference frequency between the second harmonic of the color group frequency and the fifth harmonic of the indexing frequency. There is also an interfering signal $7f_i-2f_c$ formed by the difference between the seventh harmonic of the indexing signal and the second harmonic of the color group frequency. It will be noted that these interfering signals are the result of high order cross modulation terms and are therefore of low amplitude. The square wave distribution of the indexing means is simpler and more economical to manufacture, and therefore the square wave arrangement may be preferred in some instances since the interfering cross modulation products are of such a high order as to produce relatively little video pulling. As has been stated, the square wave distribution of indexing material 60' in the image screen 32 is shown in Figure 5 of the drawings in a form convenient for comparison with the sine wave distribution shown in Figure 3. Both sine wave and square wave distributions are characterized in that they result in an indexing signal having substantially symmetrical half-cycle portions above and below the *a*—*c* axis thereof.

Figure 4 illustrates an image screen construction wherein the ultra-violet indexing phosphor distribution approximates the sine wave distribution in Figure 3. In the arrangement of Figure 4, the sine wave distribution is approximated by depositing indexing phosphor 60'' in contiguous strips having three discrete thicknesses. The arrangement of Figure 4 provides a substantially sine wave distribution of the indexing means, and a substantially sine wave indexing signal output. The arrangement shown in Figure 4 is very nearly as effective as the arrangement of Figure 3 in eliminating video pulling of the indexing signal.

A 1/3 relationship between indexing frequency and color group frequency is a preferred relationship for preventing video pulling. Other relationships can be employed. Since the indexing signal $f_i$ received by the phototube must be translated to the color group frequency $f_c$ for use in the color receiver servo system, it is desirable to use a simple frequency relationship so that a simple frequency translating circuit may be employed. It is further desirable to employ a $f_i/f_c$ ratio where the numerator is one, because frequency multiplying circuits are much simpler than frequency dividing circuits.

When a sine wave distribution of the indexing material is employed, as shown in Figure 3, the ratio $f_i/f_c$ may be 1/3, 1/4, 1/5, etc. (It has previously been shown that a ratio of 1/2 is not satisfactory.) However, if a square wave distribution of the indexing material is employed, as shown in Figure 5, the ratio $f_i/f_c$ should be one having an odd number in the denominator, such as 1/3, 1/5, etc. This is the case because a square wave, unlike a sine wave, includes harmonics, and two odd harmonics of an indexing signal having an even number in the denominator will cross modulate with the color group frequency to produce distorting difference frequencies equal to the indexing frequency. For example, if a ratio of 1/4 is employed, the difference frequency between $f_c$ and the third harmonic of $f_i$ is equal to $f_i$.

The substantially sine wave distribution approximation shown in Figure 4 has some frequency harmonics and therefore should preferably be employed in a ratio such as 1/3, 1/5, etc.

A $f_i/f_c$ relationship greater than one, such as 7/5, may be employed. However, such a relationship involves additional complexity in the frequency translating circuits. In any case, the indexing frequency should be selected so that the indexing frequency and low order harmonics thereof cannot cross modulate with the color group frequency and low order harmonics thereof to produce sum or difference frequencies in the region of the indexing signal.

What is claimed is:

1. In a color television reproducing arrangement or the like, the combination of: a color image reproducing device having an image screen and scanning means to scan said screen in line-by-line fashion, said screen including lines of a plurality of different colored light emitting strips arranged transverse to the direction of line scanning in repeating color groups which are energized at a given color group frequency by said scanning means, and indexing means disposed to be energized by said scanning means and to thereby produce an indexing signal, said indexing means having a substantially sine wave distribution in the line scanning direction, said indexing means being constructed so that said indexing signal has an indexing frequency different from said color group frequency and harmonics thereof, and so that said indexing frequency and low order harmonics thereof cannot cross modulate with said color group frequency and low order harmonics thereof to produce sum or difference frequencies in the region of said indexing frequency.

2. In a color television reproducing arrangement or the like, the combination as defined in claim 1 wherein, said indexing means comprises a plurality of strip-like areas, each area having a gradually varying thickness which approximates a sine wave distribution in the line scanning direction.

3. In a color television reproducing arrangement or the like, the combination as defined in claim 1 wherein, said indexing means comprises a plurality of strip-like areas, each area consisting of a plurality of substantially discrete thicknesses which in the aggregate approximate a sine wave distribution of said indexing means in the line scanning direction.

4. In a color television reproducing arrangement or the like, the combination as defined in claim 1 wherein, said indexing means comprises a plurality of strip-like areas of indexing material each varying in thickness from a maximum substantially at its center to a minimum substantially at its edges, said thickness variation being such that the indexing signal produced therefrom has a substantially sinusoidal waveform.

References Cited in the file of this patent

UNITED STATES PATENTS 2,771,504 Moore et al. ----------- Nov. 20, 1956